No. 735,677. PATENTED AUG. 4, 1903.
B. M. ROLPH.
DITCHING MACHINE.
APPLICATION FILED MAY 8, 1902.
NO MODEL. 4 SHEETS—SHEET 1.
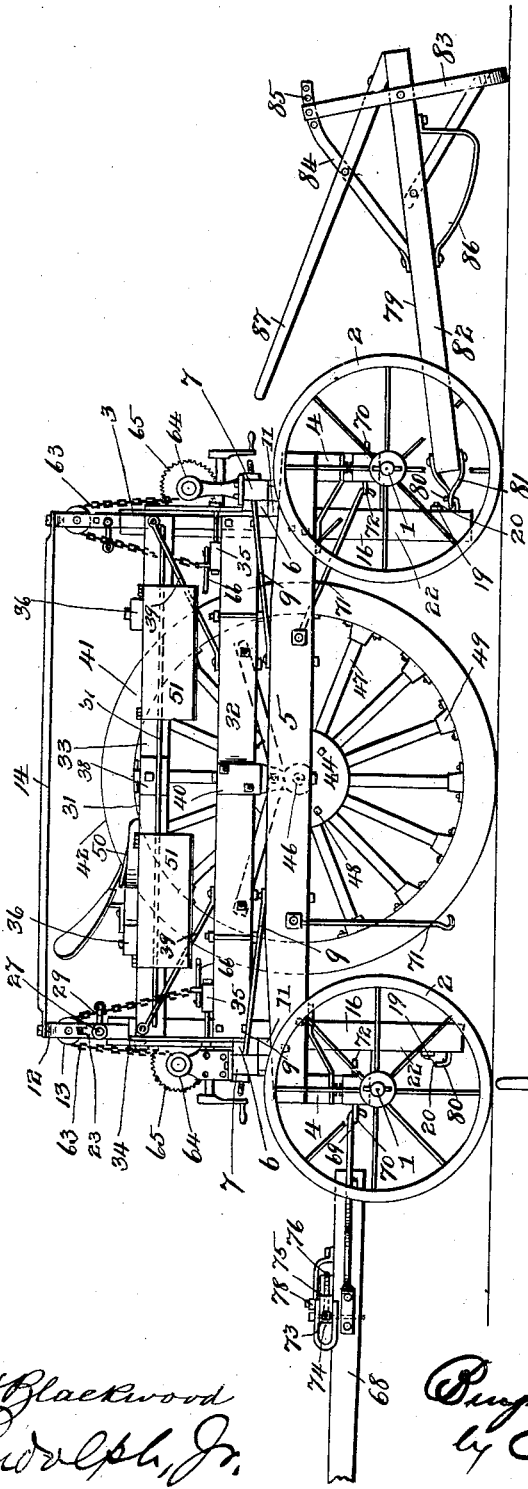
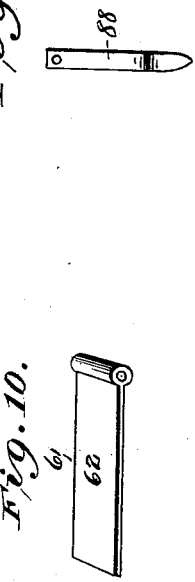
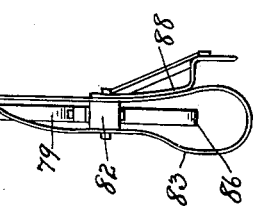
Witnesses
Jos. H. Blackwood
T. M. Randolph, Jr.
Inventor
Benjamin M. Rolph
by D. A. Tourick
Attorney

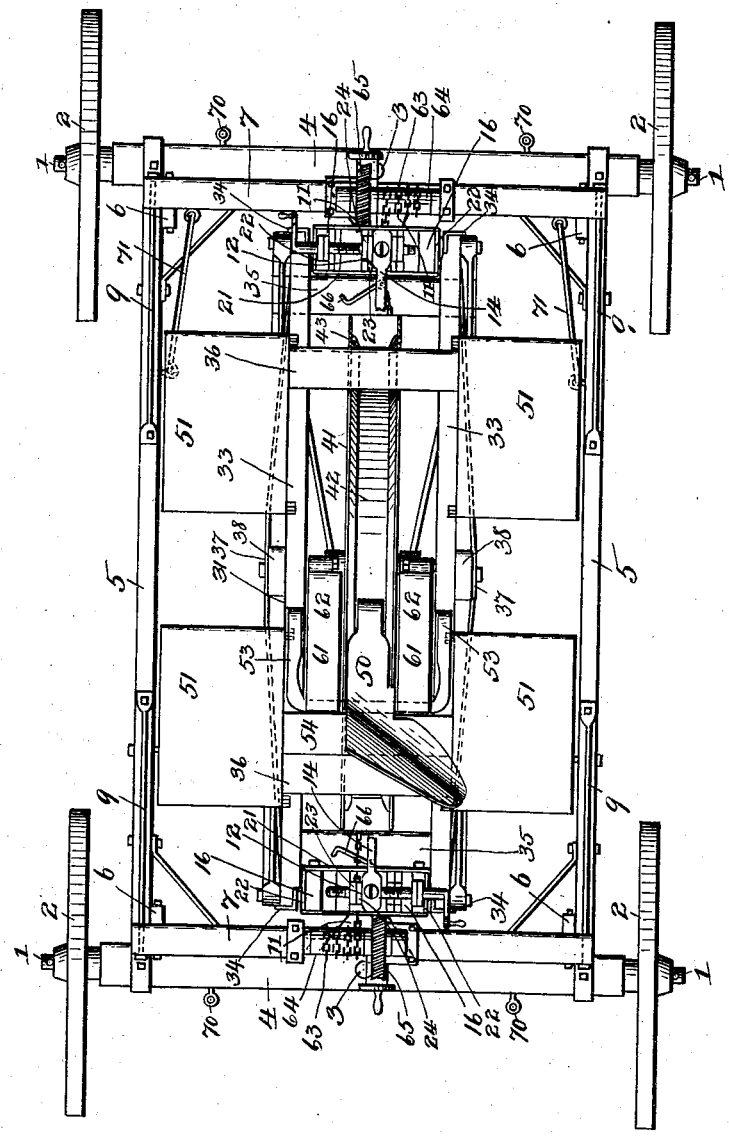

No. 735,677. PATENTED AUG. 4, 1903.
B. M. ROLPH.
DITCHING MACHINE.
APPLICATION FILED MAY 8, 1902.
NO MODEL. 4 SHEETS—SHEET 3.
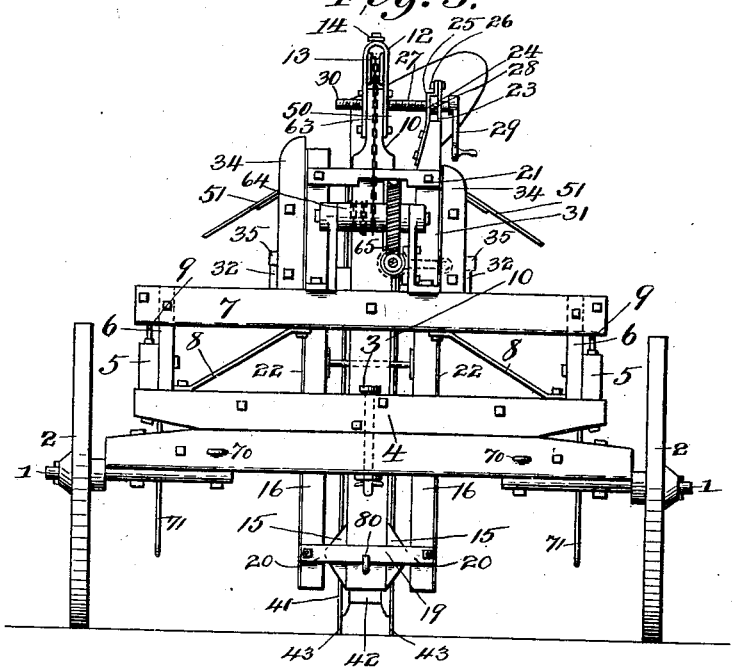
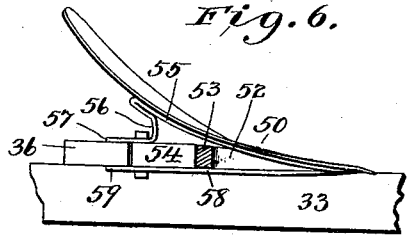
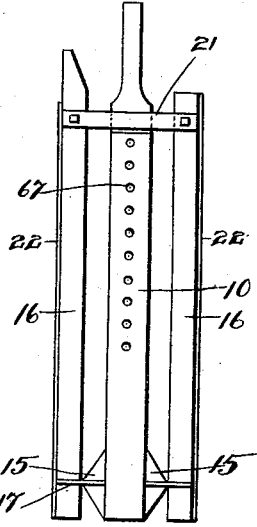
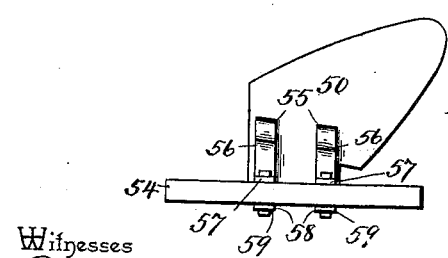
Witnesses
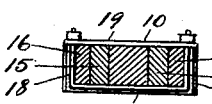
Inventor
Benjamin M. Rolph
Attorney No. 735,677. PATENTED AUG. 4, 1903.
B. M. ROLPH.
DITCHING MACHINE.
APPLICATION FILED MAY 8, 1902.
NO MODEL. 4 SHEETS—SHEET 4.
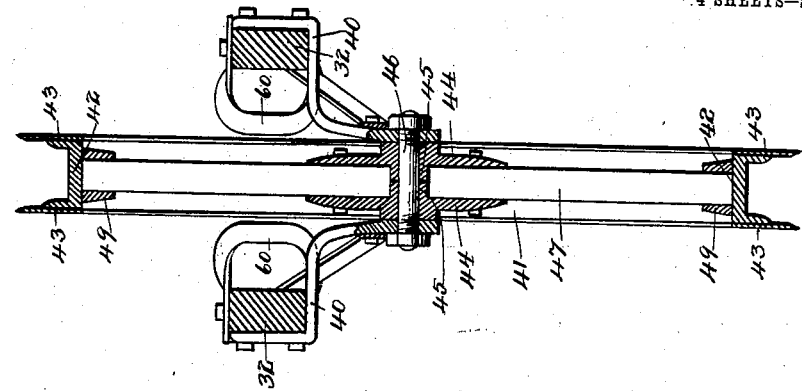
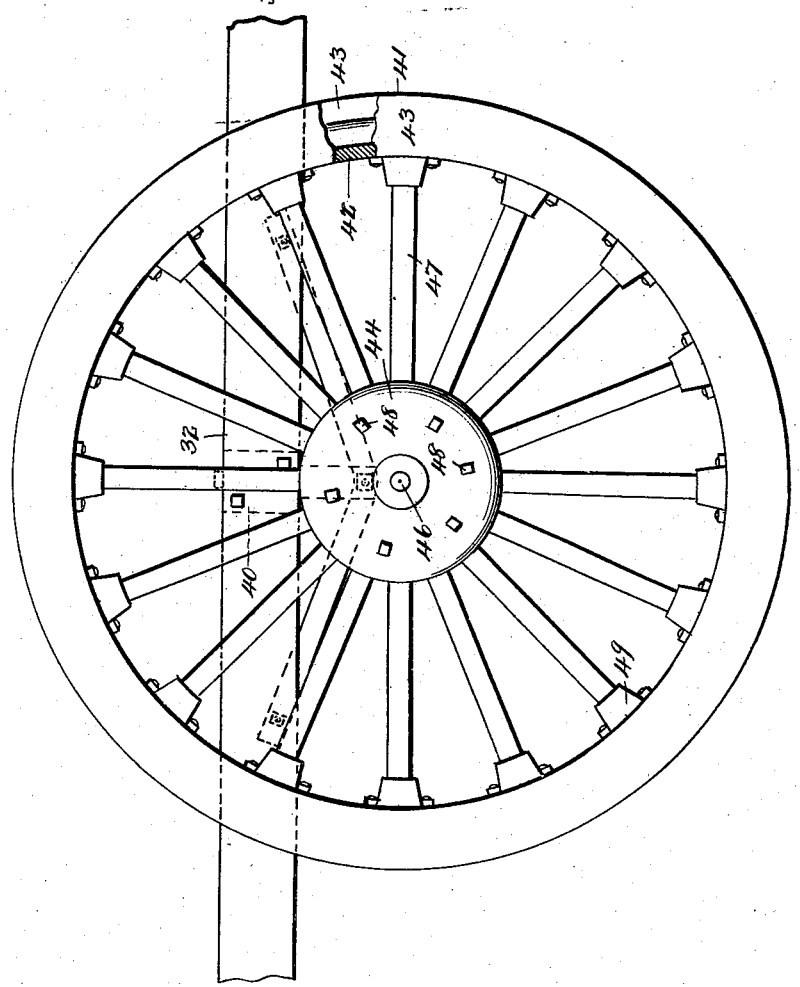
Witnesses Inventor
Jos. H. Blackwood Benjamin M. Rolph
P. Randolph, Jr. by D. A. Gourick
Attorney No. 735,677. Patented August 4, 1903.

UNITED STATES PATENT OFFICE.

BENJAMIN M. ROLPH, OF DIXON, ILLINOIS, ASSIGNOR TO FREDERICK C. AUSTIN, OF CHICAGO, ILLINOIS.

DITCHING-MACHINE.

SPECIFICATION forming part of Letters Patent No. 735,677, dated August 4, 1903.

Application filed May 8, 1902. Serial No. 106,493. (No model.)

*To all whom it may concern:*

Be it known that I, BENJAMIN M. ROLPH, a citizen of the United States, residing at Dixon, in the county of Lee and State of Illinois, have invented certain new and useful Improvements in Ditching-Machines, of which the following is a specification.

My invention relates to machines for cutting draining-ditches, and has for one of its objects to provide a machine having a ditching-wheel with a channeled periphery to form the trench and carry the soil to a plow which throws it out onto the ground.

Another object of my invention is to provide means to raise and lower the ditching-wheel and also to throw the wheel at an angle, so as to have the walls of the ditch vertical, notwithstanding the uneven nature of the surface of the ground being ditched.

Another object of my invention is to provide a machine that may be driven back and forth from one end of the ditch to the other without turning the machine around, both axles being revoluble and also adapted to be made rigid.

Other advantages of my invention will more fully appear hereinafter and by reference to the drawings, in which—

Figure 1 is a side view in elevation of my invention; Fig. 2, a top plan view; Fig. 3, an end view; Fig. 4, a detail view of the ditching-wheel and frame in which it is journaled; Fig. 5, a cross-section of the ditching-wheel; Figs. 6 and 7, detail views of the plow and frame in which it is mounted; Figs. 8 and 9, detail views of the drag-knife; Fig. 10, a view of one of the scraper-plates; Fig. 11, a view in elevation of one of the end guides, and Fig. 12 a cross-section of Fig. 11.

Referring to the drawings, in which similar reference characters indicate corresponding parts throughout the several views, 1 represents the axles of my machine, on which are journaled wheels 2. Each axle 1 is pivotally secured by means of a king-bolt 3 to a beam 4, while 5 represents side beams secured to the end beams 4, which complete the framework of the truck portion of my invention.

6 represents uprights secured to the side beams 5, near each end thereof, and 7 cross-beams secured thereto and braced by means of rods 8 to the end beams 4 and rods 9 to the side beams 5.

10 represents an upright secured to each cross-beam 7 and an extension 11 of each end beam 4. The upper end of each upright 10 has secured thereto a loop 12, made of flat metal, in which is journaled a pulley 13, the tops of said loops being connected by a brace-rod 14. On each side of the lower end of the uprights 10 are secured triangular blocks 15, having their apices outward from said uprights. 16 represents beams pivoted to the lower end of said uprights 10 by means of a rod inserted in a channel 17, cut through the apices of the triangular blocks 15 and said uprights 10 and bent at right angles to fit into a groove 18 on the side of each beam 16 and secured through a plate 19 by means of nuts 20. The tops of the beams 16 are connected by means of cross-braces 21. The outside of the beams 16 are covered with a plate of metal 22 to form a bearing-surface for the end pieces of the ditching-frame, to be hereinafter described. One of each pair of beams 16 is longer than its mate and has secured on each side, at its top, plates of metal 23 24, the plate 24 being bent in angular form, as shown at 25, and secured to the plate 23 by means of a bolt 26. Each of the plates 23 24 has a hole formed therein to receive a rod 27, which has an enlargement 28 thereon, which fits between the plates 23 and 24. The rod 27 is turned by means of a crank 29 at one end, while the other end is screw-threaded, as shown at 30, to fit into a screw-threaded bore in the top of the upright 10 and loop 12.

It will be readily understood from the construction of uprights 10, beams 16, pivoted to the lower ends of said uprights, and screw-rods 27 that the tops of the beams 16 may be swung to the right or left, as desired, relative to the upright 10 by turning the rod 27 in the direction desired. The value of this construction will appear hereinafter.

31 represents the frame carrying the ditching-wheel, which consists of side beams 32 and 33, secured to uprights 34, made, preferably, of angle-iron, the frame being braced by cross-beams 35, secured near each end to the lower side beams 32, cross-beams 36, secured to the upper side beams 33 by the truss-rods 37, secured at each end of the frame through the uprights 34 and sprung over blocks 38 on the side of the beams 33 and braces 39.

40 represents an angular bracket secured at the center of each beam 32, in which is journaled the ditching-wheel 41. The ditching-wheel 41 is made with a channel-steel rim 42, to the outside of which are secured annular plates of plow-steel 43, having their cutting edges sharpened. The hub of the wheel consists of two metal disks 44, having a central bore 45, in which is inserted an axle 46, that is suitably secured in the brackets 40. The spokes 47 of the wheel are secured between the disks 44 by means of bolts 48 and to the inner annular surface of the rim 42 by means of sockets 49 secured thereto. The purpose of this construction of wheel and brackets is to permit the wheel going into the ditch below its center, thus permitting the use of the machine in digging deeper ditches than would be possible if the wheel was journaled in an ordinary manner in the frame 31. It will also be understood that the channeled rim, with the cutting-plates 43 running on the ground, will sink therein, and the bottom of the channel being narrower than the top the soil will be compressed and remain in the rim, pulling up therewith the soil to the depth of the cut made by said plates. This will be carried up over the top of the wheel, where it will be dug out of the channel by means of a plowshare 50, having its point shaped to fit said channel and its moldboard to turn the soil out onto slanting tables 51, hinged to the beams 33. The plowshare 50 is preferably secured to the central prong 52 of a tripod 53, which is in turn secured to a block 54, 55 representing braces commencing near the point of the plowshare 50 and following the contour of its lower side for the greater part of its length, then bent down, as shown at 56, secured to the top of the block 54, and having their ends extended beyond the edge of the block, as shown at 57.

58 represents two braces that extend from near the point of the plowshare 50 underneath the block 54 and beyond its edge, as shown at 59. The purpose of this construction is to permit the plowshare and its carrying-frame to be used at either end of the machine, being held in place by means of the extended ends 57 and 59, lying above and below the cross-piece 36, and the outside prongs of the tripod 52, lying on top of the side beams 33.

60 represents guides secured to the beams 32 on each side of the wheel 41 to prevent it wabbling, while 61 also represents guides secured to the beams 33 and having plates 62, that are adapted to be used in conjunction with the plowshare 50 and scrape the outside of the cutting-plates 43 to remove any soil that might cling thereto.

The frame 31 is raised and lowered by means of chains 63, secured to the cross-beams 35, passing over pulleys 13 and around a drum 64, which is operated by a worm shaft and wheel 65. The frame may also be secured at any desired height by means of the hooks 66, inserted in holes 67 in the uprights 10.

The machine is drawn by means of draft-animals hitched to the tongue or pole 68, which is secured to the axle 1 at either end of the machine by means of hooks 69 on the tongue fitting into rings 70 on said axle or other suitable attaching device, it thus being seen that draft may be applied to either end of the machine, as desired, the trailing axle being locked in a fixed position relative to the balance of the machine by means of hooks 71, secured to the side beams 5, and rings 72, secured to the axle. This construction may also be dispensed with and any other preferred device substituted. 73 represents any preferred construction of spreader-bar.

In order to slightly widen the ditch, so as to prevent the ditching-wheel binding on its return trip, as well as cut into the soil, the depth of the channel in the ditching-wheel to discover any rocks that may be under the surface of the soil, and also to loosen the earth for the return of the ditching-wheel, I provide a drag 79 to follow the machine, secured to a hook 80 in the lower end of the upright 10 by means of a loop 81 at the end of the beam 82.

83 represents the cutting-blade, consisting of a loop of steel pivoted to the rear end of beam 82. The upper end of the loop is secured to a brace-rod 84, which is provided with a multiplicity of holes 85, so that the loop may be given any desired slant. A runner 86 is provided forward of the cutting-loop to limit the depth of said loop in the ground.

87 is a handle for the operator.

In case it should be desired to dig a ditch wider than made by the ditching-wheel, a knife 88 may be secured to one or both sides of the loop, as shown.

Having thus described my invention, what I claim is—

1. In a ditching-machine, uprights secured to a suitable truck-frame, beams at each side of said upright pivotally secured thereto at their lower ends and joined at their tops, means to swing said beams at an angle to said uprights, a frame mounted on said beams, and a ditching-wheel journaled in said frame, substantially as shown and described.

2. In a ditching-machine, uprights secured to a suitable truck-frame, triangular blocks at each side of said upright near its lower end, beams pivoted to said upright by means of rods intersecting the apices of said triangular blocks, cross-braces connecting the tops of said beams, means to swing said beams at an angle to said uprights, a frame mounted on said beams, and a ditching-wheel journaled in said frame, substantially as shown and described.

3. In a ditching-machine, uprights secured to a suitable truck-frame, beams on each side of said uprights pivotally secured at their bases and connected at their upper ends, a journal at the upper end of one of said beams, a screw-rod inserted therein and fitting into a screw-threaded bore in said upright, a frame mounted on said beams, and a ditching-wheel journaled in said frame, substantially as shown and described.

4. In a ditching-machine, a device for turning the excavated soil out of the excavating-wheel consisting of a tripod secured to a block, brace-rods secured to the upper and lower sides of said block and lying on each side of the central prong of said tripod, the upper rods being curved upwardly through a major portion of their length, and a plowshare secured to said curved rods and to the central prong of said tripod, substantially as shown and described.

5. In a ditching-machine, a truck-frame, an upright at each end thereof, beams pivotally mounted on said uprights, a vertically-adjustable frame slidably mounted on said beams, a ditching-wheel journaled in said vertically-adjustable frame and having a channel-periphery, a ring of steel secured on each side of said channel-periphery, a plowshare for turning the excavated soil out of said channeled wheel, and slanting tables secured to said adjustable frame to catch the soil from said plowshare, substantially as shown and described.

6. In a ditching-machine, a truck-frame, an upright at each end thereof, a triangular block at each side of each upright, beams pivoted on said upright by means of rods intersecting the apices of said blocks, a vertically-adjustable frame slidably mounted on said beams, a ditching-wheel journaled in said frame and having a channeled periphery, a plowshare secured to a frame and adapted to be attached to said vertically-adjustable frame, said plowshare having a point to fit into said channeled wheel, substantially as shown and described.

7. In a ditching-machine, a truck-frame, an upright secured to each end of said truck-frame, upright frames pivotally secured to said uprights and adapted to be swung at an angle relative to said uprights, a frame slidably mounted on said upright frames, means to raise and lower said slidable frame, a channeled wheel-excavator journaled in said frame, and a plowshare suitably mounted on said vertically-adjustable frame to turn the soil out of said channeled rim, said machine being adapted to be operated from either direction of the rotation of said excavating-wheel, substantially as shown and described.

8. In a ditching-machine, a trailing cutter secured to the rear of the machine consisting of a knife made of a looped strip of metal, and means to adjust the angle of said knife, substantially as shown and described.

In testimony whereof I hereto affix my signature in the presence of two witnesses.

BENJAMIN M. ROLPH.

Witnesses:
L. D. JOHNSON,
L. E. HUGHES.